(12) United States Patent
Huotari et al.

(10) Patent No.: US 7,500,269 B2
(45) Date of Patent: Mar. 3, 2009

(54) REMOTE ACCESS TO LOCAL CONTENT USING TRANSCRYPTION OF DIGITAL RIGHTS MANAGEMENT SCHEMES

(75) Inventors: Allen J. Huotari, Garden Grove, CA (US); Mark John Baugher, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

(21) Appl. No.: 11/075,197

(22) Filed: Mar. 7, 2005

(65) Prior Publication Data

US 2006/0156416 A1    Jul. 13, 2006

Related U.S. Application Data

(63) Continuation-in-part of application No. 11/032,764, filed on Jan. 7, 2005.

(51) Int. Cl.
*G06F 7/04*       (2006.01)
*H04L 9/00*       (2006.01)

(52) U.S. Cl. .............................. 726/27; 726/26; 726/3; 713/153

(58) Field of Classification Search .................. 726/27, 726/26, 3; 713/153
See application file for complete search history.

(56) References Cited

U.S. PATENT DOCUMENTS

| | | | |
|---|---|---|---|
| 6,065,120 A | 5/2000 | Laursen et al. | |
| 6,438,550 B1 | 8/2002 | Doyle et al. | |
| 6,452,925 B1 | 9/2002 | Sistanizadeh et al. | |
| 6,618,858 B1 | 9/2003 | Gautier | |
| 6,675,208 B1 | 1/2004 | Rai et al. | |
| 6,826,699 B1 * | 11/2004 | Sun | ............................... 726/5 |
| 6,856,591 B1 | 2/2005 | Ma et al. | |
| 6,988,210 B1 | 1/2006 | Audebert | |
| 6,993,580 B2 | 1/2006 | Isherwood et al. | |
| 7,076,653 B1 | 7/2006 | Remer et al. | ................. 713/155 |
| 7,076,655 B2 | 7/2006 | Griffin et al. | ................. 713/164 |

(Continued)

FOREIGN PATENT DOCUMENTS

WO        2004025926        3/2004

OTHER PUBLICATIONS www.w3.org, "Protected W3C httpd Setup," 5 pages total, Jul. 1995, W3, www.w3.org/daemon/user/config/accessauth.html.

(Continued)

*Primary Examiner*—Emmanuel L Moise
*Assistant Examiner*—Techane J Gergiso
(74) *Attorney, Agent, or Firm*—Stolowitz Ford Cowger LLP

(57) ABSTRACT

Methods and devices allowing distribution of content that resides in a source device on a local area network (LAN) are described. A gateway between the LAN and a wide area network (WAN) receives from a sink device a request for an instance of content. The request is sent over the WAN. Distribution of the item of content within the LAN uses a first digital rights management (DRM) protocol that prevents the item of content from being distributed outside the LAN. For the item of content, the gateway converts from the first DRM protocol to a second DRM protocol that can be used for transmitting content over the WAN. The item of content can then be forwarded to the sink device according to the second DRM protocol.

14 Claims, 5 Drawing Sheets

U.S. PATENT DOCUMENTS

| | | | |
|---|---|---|---|
| 7,103,574 B1* | 9/2006 | Peinado et al. ............... 705/51 |
| 7,103,769 B1 | 9/2006 | Fleming et al. |
| 7,114,070 B1 | 9/2006 | Willming et al. |
| 7,143,287 B2 | 11/2006 | Bade et al. |
| 7,149,722 B1* | 12/2006 | Abburi ........................ 705/59 |
| 7,181,620 B1 | 2/2007 | Hur |
| 7,224,805 B2* | 5/2007 | Hurst et al. ................. 380/285 |
| 7,287,282 B2 | 10/2007 | Yamada et al. |
| 7,322,043 B2 | 1/2008 | Letsinger |
| 2002/0025042 A1* | 2/2002 | Saito ........................ 380/258 |
| 2002/0112186 A1 | 8/2002 | Ford et al. |
| 2002/0114462 A1* | 8/2002 | Kudo et al. ................. 380/203 |
| 2002/0116647 A1 | 8/2002 | Mont et al. |
| 2003/0005285 A1* | 1/2003 | Graunke ..................... 713/153 |
| 2003/0007646 A1* | 1/2003 | Hurst et al. ................. 380/285 |
| 2003/0023564 A1* | 1/2003 | Padhye et al. ................. 705/54 |
| 2003/0110378 A1* | 6/2003 | Yamada et al. ............. 713/161 |
| 2003/0135730 A1* | 7/2003 | Szucs et al. ................. 713/153 |
| 2003/0145214 A1* | 7/2003 | Saito et al. ................. 713/189 |
| 2003/0185233 A1 | 10/2003 | Ji et al. |
| 2003/0198351 A1* | 10/2003 | Foster et al. ................ 380/281 |
| 2003/0216143 A1 | 11/2003 | Roese et al. |
| 2003/0226011 A1* | 12/2003 | Kuwano et al. ............. 713/155 |
| 2003/0226012 A1* | 12/2003 | Asokan et al. ............. 713/156 |
| 2003/0229792 A1 | 12/2003 | Baldwin et al. |
| 2003/0236991 A1* | 12/2003 | Letsinger ................... 713/200 |
| 2004/0022253 A1 | 2/2004 | Foschiano et al. |
| 2004/0022390 A1 | 2/2004 | McDonald et al. |
| 2004/0032950 A1* | 2/2004 | Graunke ..................... 380/42 |
| 2004/0042413 A1* | 3/2004 | Kawamura et al. .......... 370/252 |
| 2004/0053622 A1* | 3/2004 | Nakakita et al. ............ 455/450 |
| 2004/0123152 A1 | 6/2004 | Le Saint |
| 2004/0131357 A1* | 7/2004 | Farmer et al. ................. 398/67 |
| 2004/0133780 A1* | 7/2004 | Saito et al. ................. 713/168 |
| 2004/0151179 A1* | 8/2004 | Andre et al. ................ 370/392 |
| 2004/0161108 A1* | 8/2004 | Ando et al. ................. 380/201 |
| 2004/0168062 A1* | 8/2004 | Isozaki et al. ............... 713/171 |
| 2004/0168081 A1 | 8/2004 | Ladas et al. |
| 2004/0213260 A1 | 10/2004 | Leung et al. |
| 2004/0225806 A1* | 11/2004 | Emura et al. ................. 710/305 |
| 2005/0004875 A1* | 1/2005 | Kontio et al. ................. 705/52 |
| 2005/0039037 A1* | 2/2005 | Sakoh ........................ 713/193 |
| 2005/0063333 A1 | 3/2005 | Patron et al. |
| 2005/0074121 A1* | 4/2005 | Miura ........................ 380/255 |
| 2005/0075986 A1* | 4/2005 | You et al. ..................... 705/71 |
| 2005/0086514 A1* | 4/2005 | Han et al. ................... 713/200 |
| 2005/0086532 A1* | 4/2005 | Lotspiech et al. ........... 713/201 |
| 2005/0125357 A1* | 6/2005 | Saadat et al. ................. 705/57 |
| 2005/0169473 A1* | 8/2005 | Candelore ................... 380/239 |
| 2005/0182931 A1* | 8/2005 | Robert et al. ............... 713/168 |
| 2005/0192902 A1* | 9/2005 | Williams ..................... 705/51 |
| 2005/0209972 A1* | 9/2005 | Bjorkengren et al. ......... 705/57 |
| 2005/0210261 A1* | 9/2005 | Kamperman et al. ........ 713/182 |
| 2005/0228874 A1 | 10/2005 | Edgett et al. |
| 2005/0229004 A1 | 10/2005 | Callaghan |
| 2005/0234735 A1* | 10/2005 | Williams ........................ 705/1 |
| 2005/0246529 A1 | 11/2005 | Hunt et al. |
| 2006/0005254 A1 | 1/2006 | Ross |
| 2006/0010442 A1 | 1/2006 | Desai et al. |
| 2006/0059573 A1* | 3/2006 | Jung et al. ..................... 726/31 |
| 2006/0112015 A1* | 5/2006 | Chancellor et al. ............ 705/51 |
| 2006/0150238 A1 | 7/2006 | D'Agostino |
| 2006/0190621 A1* | 8/2006 | Kamperman et al. ........ 709/245 |
| 2006/0198519 A9* | 9/2006 | Candelore ................... 380/239 |
| 2007/0027814 A1* | 2/2007 | Tuoriniemi ................... 705/59 |
| 2007/0162981 A1* | 7/2007 | Morioka et al. ................. 726/30 |

OTHER PUBLICATIONS

International Searching Authority, PCT/US2006/00411 International Search Report and Written Opinion, Jan. 26, 2007, pp. 2-13, ISA/US Alexandria, Virginia USA.

en.wikipedia.org, "Time to live", 2 pages total, Mar. 22, 2008, http://en.wikipedia.org/wiki/Time_to_live.

www.dtcp.com, "5C Digital Transmission Content Protection White Paper," 15 pages total, Jul. 14, 1998, Hitachi, Ltd., Intel Corporation, Matsuhita Electric Industrial, Co., Ltd., Sony Corporation, Toshiba Corporation; www.dtcp.com/data/wp_spec.pdf.

* cited by examiner

| | DHCP-BASED NETWORK SERVICE | |
|---|---|---|
| | SAME SUBNET AS DEVICE | SAME CREDENTIAL AS DEVICE |
| HOUSEHOLD DEVICE | TRUE | TRUE |
| MOBILE DEVICE | FALSE | TRUE |
| VISITOR DEVICE | TRUE | FALSE |
| FOREIGN DEVICE | FALSE | FALSE |

REMOTE ACCESS TO LOCAL CONTENT USING TRANSCRYPTION OF DIGITAL RIGHTS MANAGEMENT SCHEMES

RELATED APPLICATION

This application is a Continuation-in-Part of the co-pending, commonly-owned U.S. patent application Ser. No. 11/032,764, filed Jan. 7, 2005, by M. Baugher and entitled "Using a Network-Service Credential for Access Control."

TECHNICAL FIELD

Embodiments of the present invention pertain to controlling access to content residing on a network.

BACKGROUND ART

Digital Rights Management (DRM) schemes protect the rights of digital content owners by, in general, restricting access to and/or use of their content. One network data security scheme is the DTCP/IP (Digital Transmission Content Protection over Internet Protocol) standard. According to DTCP/IP, digital content can be shared securely between devices in a home network but is not shared with third-parties outside the home network. Using an authentication scheme, devices in the home network can be designated as trusted destinations, but DTCP/IP will not allow the content to be transmitted over, for example, the Internet to be shared outside the home network. Therefore, according to DTCP/IP, a remote device (e.g., a mobile or nomadic device) cannot access content that is stored in the home network while the device is outside the home network (e.g., while roaming), even if the remote device legitimately should have access to the content. Also, because DTCP/IP does not function over wide area networks (WANS) or the Internet, a digital media adapter (DMA) or other home network device that only implements DTCP/IP cannot render content that is sourced from outside the home network.

There exist many DRM schemes other than DTCP/IP that can be used to protect content transported over a broadband network such as the Internet. Conceivably, support for each of the DRM schemes could be provided in each device in the home network. However, this can drive up the cost of such devices, perhaps unnecessarily so for consumers that do not have a need to support content distribution to remote devices.

DRM schemes that protect content using encryption have key management methods to securely provide a decryption key to an end-system that is authorized to receive the encrypted and authenticated (protected) content. Key management techniques are known in the art, but different DRM systems are distinguished by different key management and authorization systems, which make the decision whether or not to distribute the key to an end-system.

Accordingly, a device and/or method that can permit local content to be distributed to remote devices, but still protects the content against improper distribution, would be advantageous.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
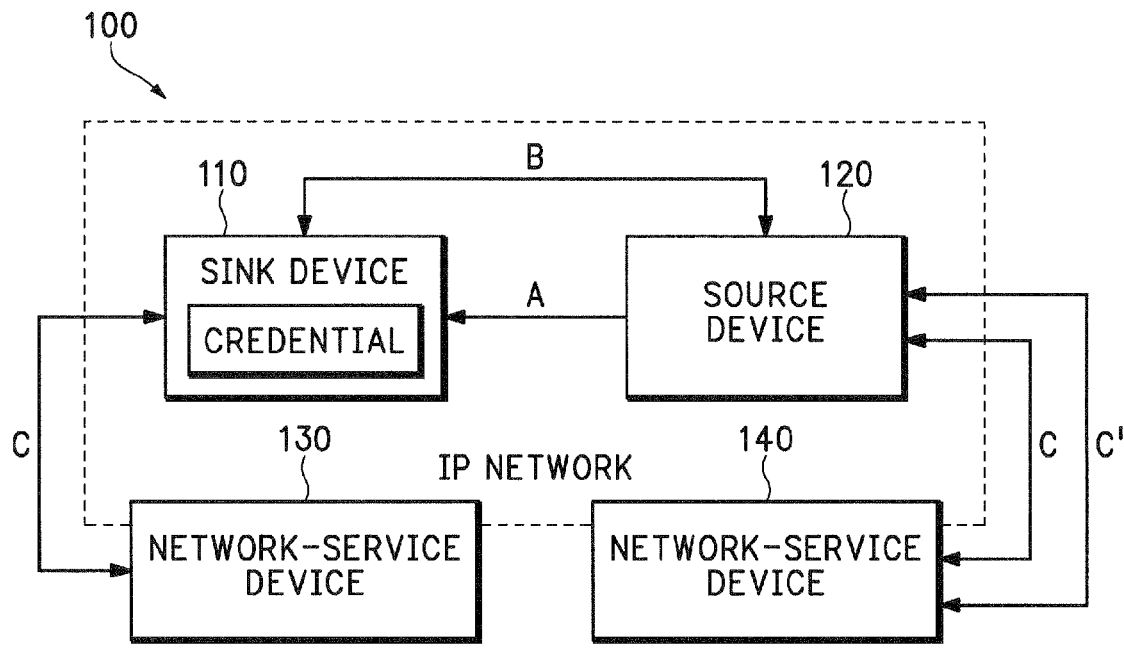
FIG. 1 is a block diagram of a network according to an embodiment of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "converting," "authenticating," "authorizing," "identifying," "forwarding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Using a Network-Service Credential for Access Control FIG. 1 is a block diagram of a network 100 according to an embodiment of the present invention. In one embodiment, network 100 is a representation of a household or home network with devices on the network. In another embodiment, network 100 is a representation of an enterprise network with devices on the network.

In the example of FIG. 1, the network 100 includes a sink device 110 upon which embodiments of the present invention can be implemented, a source device 120, a network-service device 130, and a network-service device 140. In the example of FIG. 1, all devices are at least connected to a private network (e.g., a household or enterprise network), and may be connected to a public network as well (e.g., an Internet point of presence operated by an Internet service provider). The private network can include more elements than the example illustrated in the figures. Also, there can be additional source or sink devices located on the private network, and additional network-service devices, which may or may not straddle the public network (e.g., a gateway device that has one network interface on the private network and an interface on one or more public networks).

Continuing with FIG. 1, in one embodiment, the sink device 110 attempts to receive data from a source device 120 along arc A. Typically, the data is encrypted and the sink device 110 requests a decryption key from the source device 120 or some third device along arc B. Such key establishment algorithms, in which the requester presents a credential to the responder who uses it to authorize access, are well known. In FIG. 1, the requester is the sink device 110 and its authorizing credential is the network-service credential, which was previously obtained during the enrollment process by an arc C exchange. In the present embodiment, the sink device 110 secures the arc C exchange with IP Security (Ipsec) protocols using Digital Transmission License Authority (DTLA) credentials, which are initialized in sink device 110 memory (e.g., the credential for the device identity is in memory along with the root public key for the DTLA authority). Typically, the source device 120 and sink device 110 mutually authenticate using their respective keys and DTLA credentials. In one embodiment of the present invention, sink device 110 additionally passes its network-service credential to prove that it has enrolled on the particular network service, and source device 120 uses this credential for authorization purposes (e.g., to conditionally allow access to content works that are restricted to devices that are enrolled on a particular network).

The network-service device 130 and sink device 110 mutually authenticate using the DTLA credential when the sink device has no network-service credential but use both the DTLA and network service credential subsequent to the first network-service enrollment.

Alternative embodiments may use other authorities instead of or in addition to the DTLA, such as the Content Management License Administration (CMLA) of the Open Mobile Alliance (OMA).

In one embodiment, the arc C exchange occurs entirely within a household network between the sink device and the home-network device, which runs a Dynamic Host Configuration Protocol (DHCP) server of administratively scoped IP addresses. In another embodiment, the arc C exchange occurs between the home-network device and a service provider's equipment to obtain the service provider's network-service credential. In yet another embodiment, the arc C' exchange occurs in which a device can obtain or query additional credentials when the service is multi-homed. (A multi-homed device has more than one interface to the public network and appears as a set of devices, each with its own network-service credential).

With reference to FIG. 1, transactions on the arcs are confidential and integrity-protected. In one embodiment, source, sink, and network-service devices each have a secret, public/private keypair. It is known for a licensing authority to sign a credential that contains the device's public key and thereby attest to compliance with a device license or security policy. Digital Transmission Content Protection (DTCP), Content/Copy Protection for Recordable Media (CPRM) and High-bandwidth Digital Content Protection (HDCP) devices are examples of such devices. In the present invention, the network-service credential attests to device compliance with the network on which the device resides.

Figure 2:
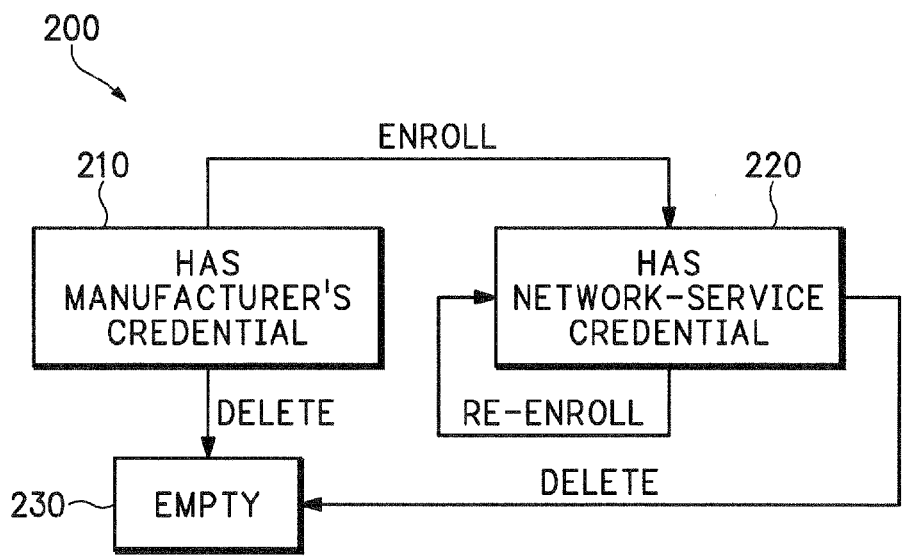
FIG. 2 is a state transition diagram for credentialing a device according to an embodiment of the present invention.

FIG. 2 is an apparatus state transition diagram 200 showing different enrollment states according to an embodiment of the present invention. This diagram defines how a network-service credential is initialized in non-volatile apparatus memory, maintained, deleted, and replaced with another credential. FIG. 2 depicts an embodiment in which the device is permitted to enroll in exactly one network service.

According to the embodiments of the present invention, the non-volatile apparatus memory is initialized with a copy of the device manufacturer's DTLA certificate. This state is referred to in the state transition diagram 200 as "HAS MANUFACTURER'S CREDENTIAL" 210. A DELETE operation erases credential memory to disable the apparatus. This state is referred to in the state transition diagram 200 as "EMPTY" 230. An ENROLL transaction (as within arc C of FIG. 1) replaces the device-manufacturer's credential in the apparatus with a network-service credential. This state is referred to in the state transition diagram 200 as "HAS NETWORK-SERVICE CREDENTIAL" 220. Subsequent RE-ENROLL transactions (as within arc C of FIG. 1) authenticate using the current network-service credential. Network-service equipment and operators do not necessarily allow every device to automatically ENROLL or RE-ENROLL, which in an embodiment is an infrequent procedure performed by the user when the device is first installed in the residence or office, or at the time of moving to a new or different household or enterprise network. The mobile case is special because source devices may accept local credentials with non-local IP addresses. In an alternative embodiment, the network enrollment is entirely under user control and the device may be enrolled and re-enrolled entirely under user control.

Continuing with reference to FIG. 2, the ENROLL transaction according to embodiments of the present invention is further described. Rather than physical proximity, the present invention uses a logical association between a data-processing device and a network-service device, which issues a signed credential when the particular source or sink device enrolls on its network. A credential typically identifies a particular authority whose signature conveys implicit authorization for some access. The network-service credential identifies the network-service, which includes the name or address of the service provider and optional subscriber information. The name is a large (e.g., 16 byte) and random number in an embodiment, and the address is an IP address.

Network service providers have various means to associate a subscriber with an interface to their network, including the medium access control address of a broadband modem. In one embodiment, an explicit identifier for a network subscriber is defined, which may be referred to as a "subscriber identifier (ID)." The subscriber ID conveys information that the network-service uses to identify a subscriber's home network. According to DHCP standards, the subscriber ID option is stripped off along with physical network information before the network address is passed to a subscriber's device. In one embodiment of the present invention, upon enrollment, the network-service identifier is returned to the device in the form of a network-service credential.

In an embodiment, an authority issues the network-service credential or delegates this role to the network operator or equipment vendor. This authority issues a certificate attesting to one or more things about a device. For multimedia devices, a licensing authority issues a digitally signed credential attesting that the device is authorized to process some class of data. Such licensing authorities exist for DVD, IEEE 1394, OMA, and digital video devices. The DTLA licenses DTCP devices on IEEE 1394 buses, IP networks, and other communications media.

In one embodiment, the apparatus uses the DTLA, CMLA or some other device licensing authority as a signing authority for network-service credentials. In another embodiment, the apparatus uses the certificate authority of the network service. In yet another embodiment, the apparatus accepts equipment vendors' credentials. In these embodiments, the credential contains the cryptographic identity (e.g., the public key in an 14509 certificate) of the device and of the network service provider. The destination (sink) and network-service devices use these identities in authenticated key establishment, such as in a DTCP, Protected Entertainment Rights Management (PERM) or Internet Key Exchange (IKE) procedure. Thus, the apparatus maintains a network-service identity after an enrollment transaction, which serves as a unique string for the network service. In an embodiment, the apparatus is physically attached to a data-processing device on a private network, which becomes logically associated with a network service upon enrollment. The methods for disassociation with the network (de-enrollment) and association with a new network (re-enrollment) can be mandated by security policies and licensing rules that are implemented in compliant devices.

Figures 3, 4:
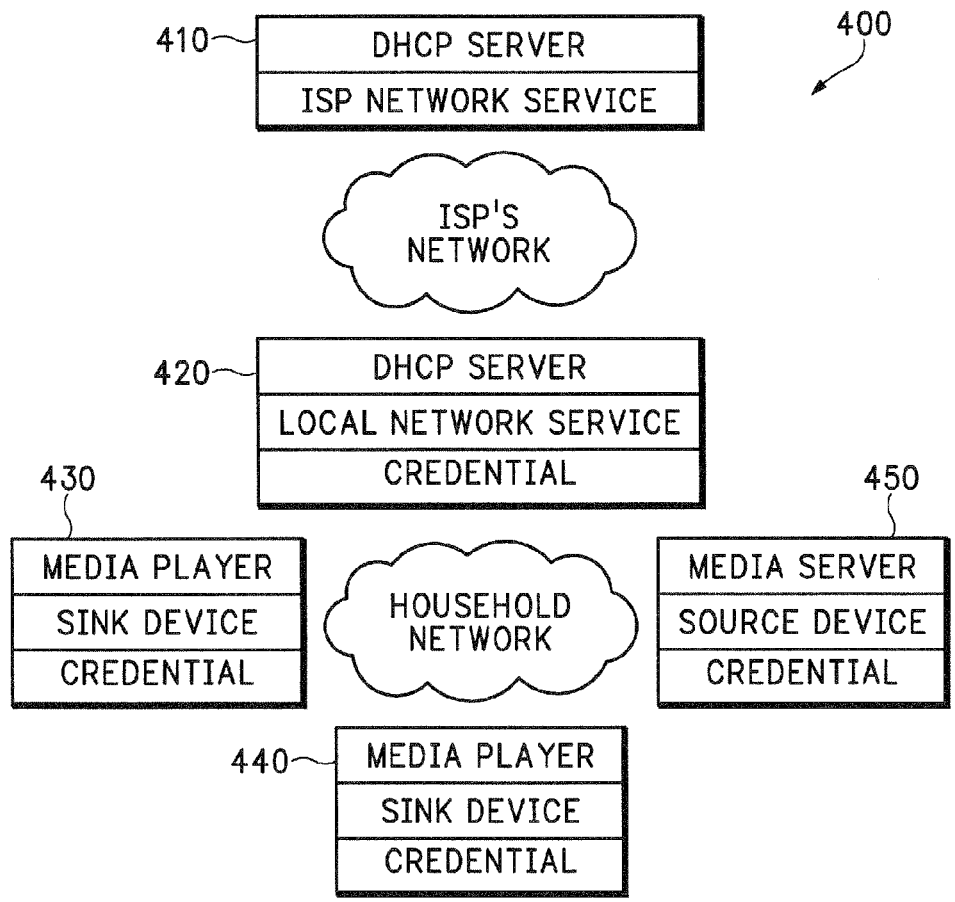
FIG. 3 is a logic table that can be used to determine the type of device (household, mobile, visitor, or foreign) that is attempting to gain access to data on a network according to an embodiment of the present invention.
FIG. 4 is a block diagram showing an embodiment of the household model with two sink devices and a source device on an administratively-scoped household network.

Referring now to FIG. 3, in an embodiment, distinctions such as mobile and household transactions are enumerated as shown in the FIG. 3 truth table 300. In one embodiment, a mobile operation is defined in which a device with a non-local address authenticates with a local credential. The present embodiment, therefore, uses a logical rather than a physical notion of network service for home and enterprise networks that extends to remote devices on the Internet. Furthermore, the subject invention applies to networks that have no connection to the Internet and to those that have multiple Internet Service Provider (ISP) connections (e.g., are "multi-homed"). A home network typically operates among household devices even when Internet connectivity is unavailable, temporarily or permanently.

Continuing with reference to FIG. 3, the truth table 300 can be used to determine what type of device (designated herein as household, mobile, visitor, or foreign devices) is attempting to gain access to a particular DHCP-based network service (e.g., a server of movies or other media). In one embodiment, the truth table 300 resides in the authorization logic of a server or source device on the same network as the sink device. The type of a device attempting to gain access to data on a source device can be determined based on its IP address and network-service credential. If it were a household device attempting to gain access, it would have the same IP address range (e.g., subnet) and same network-service credential as the DHCP-based network service device's apparatus. If it were a mobile device, it would have a different IP address and the same network-service credential as the DHCP-based network service device's apparatus. If it were a visitor device, it would have the same IP address range (e.g., subnet) and a different network-service credential as the DHCP-based network service device's apparatus. And, if it were a foreign device, it would have a different IP address and a different network-service credential as the DHCP-based network service device's apparatus.

An item of content, for example, can be labeled as being available only to certain types of devices. For example, an item of content identified as being available only to household devices would only be provided to a sink device that is identified as a household device according to truth table 300.

FIG. 4 is a block diagram showing an embodiment of the household network model 400. On household network model 400, each source and sink device (430, 440, and 450) enrolls with the local DHCP server 420, which in turn enrolls with the ISP DHCP server 410 for the ISP's network. The local DHCP server 420 uses its manufacturer's credential for authorizing the network credential it issues, and it uses its manufacturer's DTLA credential in this way until it enrolls with the ISP DHCP server 410, which then issues another network-service credential for the household DHCP service. The presence and identity of the devices on the private network are disclosed only to the local network service and not to the ISP network service, when there is a private network (e.g., when network address translation is used on a home network). In an embodiment that has a local network service on a private network, the device may receive a pair of credentials, one for the local network service and one for the ISP's network service. Thus, a data-processing device on a home network becomes associated with a network service in the form of a unique string for the network service. This is true in embodiments that are independent of DHCP as well as those that co-locate the network service with a DHCP server or relay.

Figure 5:
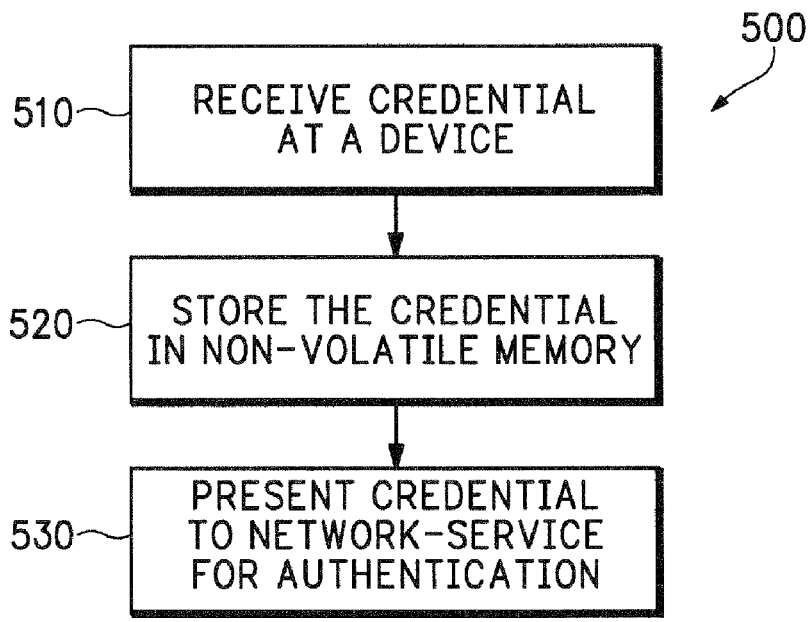
FIG. 5 is a flowchart of a method for credentialing a device according to an embodiment of the present invention.

FIG. 5 is a flowchart of a method 500 for credentialing a device according to an embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

In step 510, a credential is received at a device. The credential indicates that the device is enrolled in the network or service.

In step 520, the credential is stored in non-volatile memory on the device. The credential binds the device to the network and thus controls device access to other networks, according to the particular policies of those networks.

In step 530, the device presents the credential to a provider of a service. The provider uses the credential to authenticate the device, wherein upon authentication the authorized device is provided access to the service. Whether the device is authorized is determined by truth table 300 and licensing constraints on the content in an embodiment. If the device has a household IP address and is enrolled on the household network, for example, it may be authorized to access household content whereas a mobile or foreign device may not be so authorized. The presentation of the credential and the authentication process are transparent to a user of the device.

In summary, a signed credential (or network-service credential) can be used to enable and control data access on a network. In general, a logical association can be used between a data-processing device and a network-service device, which issues a network-service credential when the particular source or sink device enrolls on its network.

A network-service credential can be stored on a device and used to identify the network or service to which the device belongs. The device remains bound (via logical association using a network-service credential) to a particular network-service until another network-service permits re-enrollment, which is done according to the terms of a particular licensing authority or security policy. Using a network-service credential, the device is permitted only one network-service association at a time, although multiple network-service associations may be allowed. If the device is illegitimately bound to one network-service, however, it can be prevented from legitimately binding to any other network-service when the policy is to restrict enrollment to one network service. Those wanting, for example, data-dissemination controls on home or enterprise networks can control data transfer on, to, and from these networks.

In one embodiment, a credential is provided to a device. The credential enrolls the device in the network; more generally, the credential indicates that the device is enrolled in the network. The credential is stored in non-volatile memory on the device. The credential binds the device to the network and prevents the device from accessing another network when the policy is to restrict network enrollment to a single network service. The device presents the credential to a provider, and the provider uses the credential to authenticate and authorize the device. Following successful authorization, the device is provided access to the service to which it has previously enrolled. Essentially, a device is authenticated and authorized using its credentials, regardless of who may be using the device. Data-dissemination controls can thus be provided on home or enterprise networks to enable and control data transfer on, to, and from these networks.

Remote Access to Local Content Using Transcryption of DRM Schemes

Licensed systems such as DTCP/IP and OMA DRM version 2.0 encrypt content works as a means to limit access to those works. These licensed systems have key management protocols to manage and establish decryption keys to the encrypted content works. An endpoint device will authenticate to some identity and prove that it is authorized to receive the key, which is most commonly called "authenticated key establishment" (AKE).

DTCP/IP, OMA DRM 2.0, CPRM and other licensed systems implement AKE using credentials that a licensing authority has issued to authorized devices. As with any other Certificate Authority (CA) or Public Key Infrastructure (PKI), the licensing authority signs the credential, which identifies the device by the device's public key and optional name. The device presents the credential to a source of licensed data. This source requires a valid credential as a condition for granting access to the plaintext key. The device presents the credential to prove its authorization for the licensed data (e.g., entertainment content works) and to gain access to the decryption key. In some cases the authorization decision consists of a single check of a digital signature to ensure that the relevant authority had issued the credential and has not subsequently revoked that credential. In other cases, licensed systems use complex authorization. As a case in point, OMA DRM 2.0 matches a plurality of capabilities and permissions in a DRM authorization language, which is more complex than a signature validation.

According to embodiments of the present invention, either simple or complex authorization processing can be offloaded, as described in more detail below. According to application needs, authorization processing may be done in a proxy, or in a proxied device, or in both the proxy and the proxied device. When content is accessed through a gateway or intermediate system that acts as a proxy to the transaction, it is often useful to enable the proxy to participate in the key management exchange. Unlike conventional key management protocols, the proxy of the subject invention can participate in the key establishment protocol. Unlike conventional proxy systems, the authorization function can be distributed in addition to the data. A proxy that performs device authentication, authorization, and key management is referred to herein as an "authorizing proxy." In one embodiment, the proxy stores the key in plaintext (e.g., unencrypted) and securely downloads the key to authorized devices following successful authentication, access-control approval and key management exchanges, any of which may terminate at the proxy.

Alternatively, the exchange endpoint may be the proxied device rather than the proxy; this is referred to herein as a "non-authorizing proxy." In an embodiment of a non-authorizing proxy, the proxy relays each key management or authentication protocol message directly to the proxied device. In another embodiment, the proxy relays the message to the destination device, which responds directly to the proxied device (instead of to the proxy). In yet another embodiment, the proxy acts as a "man-in-the-middle" of the transaction so it can learn the key during the message exchange. A proxy that learns the key in this way can offload authorization and key management requests from a key management server. An embodiment applies the subject invention to secure multicast and broadcast of media to allow very large numbers of receivers to establish keys without communicating with a central server and without having a single point of failure in the key management system.

Figure 6:
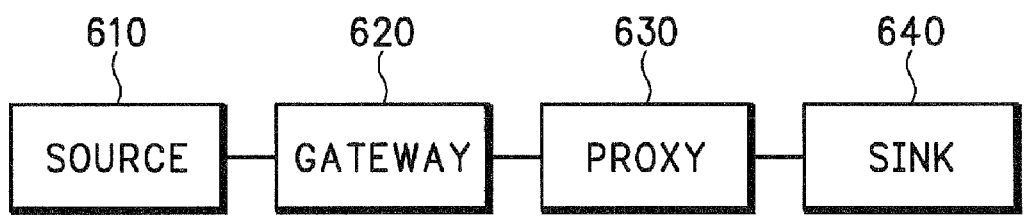
FIGS. 6 and 7 are block diagrams each showing a path between a sink device and a source device according to embodiments of the present invention.
Figure 7:
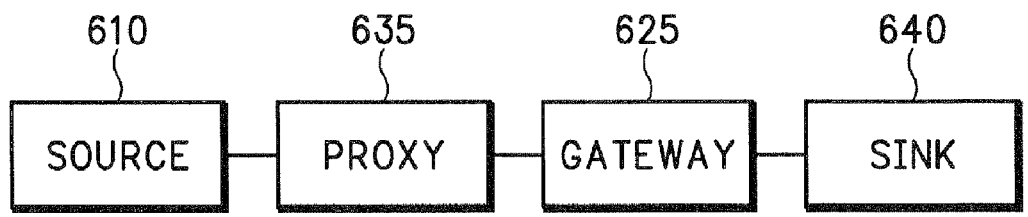

FIGS. 6 and 7 show a delivery path of a licensed work from a source 610 to a sink 640 according to embodiments of the present invention. Key management messages flow across all or part of the path. One or more gateway devices (gateway 620) may separate the source 610 and sink 640. In the example of FIG. 6, the proxy 630 is behind the sink's gateway and thus is on the sink's network, which in one embodiment is a private, home network. The gateway 620 and the proxy 630 are logical functions that may be co-located in the same physical device (e.g., the proxy 630 might be integrated into the sink's gateway 620).

In the example of FIG. 7, the proxy 635 is behind the source's gateway and thus is on the source's network. The gateway 625 and the proxy 635 are logical functions that may be co-located in the same physical device (e.g., the proxy 635 might be integrated into the sink's gateway 625).

In one embodiment, proxy 635 is an authorizing proxy, which may be on either side of the gateway 625 (e.g., as in FIG. 6). In the present embodiment, the sink 640 initiates an exchange with the source 610, which has licensed content (data) that the sink 640 is seeking to access. At some time before the sink 640 initiates an authorization request, or following the first message from the sink 640, the proxy 635 runs an exchange with the source 610. During an authorization exchange, the proxy 635 identifies itself using authenticating materials. If the source 610 is able to authenticate the proxy 635, it checks the access privileges of the proxy 635. In one embodiment, an access control list is used to validate the signature (e.g., the source 610 performs one or a small number of signature verifications before downloading a key to the proxy 635). However, the exchanges could include many more checks of much more information, as described for OMA DRM 2.0.

The goal of the exchanges described above is to obtain a decryption key, but the protocol run between proxy 635 and sink 640 may differ from that run between proxy 635 and source 610. In one embodiment, the proxy 635 runs DTCP/IP to the sink 640 and a second protocol (e.g., IPsec) ESP to the source 610. In another embodiment, the source 610 and proxy 635 use a file encryption and authentication protocol, such as RFC 3394 key wrap (as used with OMA DRM 2.0), but the proxy 635 runs DTCP/IP to the sink 640. Once an authorizing proxy obtains the key, it is by assumption authorized to distribute the key to other sinks that have the appropriate credentials.

There may be cases where the owner or distributor of a content work will not choose to offload the key access-control function to the proxy 635. In another embodiment, with reference to FIG. 7, a "non-authorizing proxy" system can be implemented, in which the proxy 635 relays the AKE messages to and from the device being proxied by proxy 635. The gateway 625 may be placed on either side of the proxy 635 (as in FIG. 6).

In one embodiment, all AKE request and response messages are relayed unchanged by the proxy 635, which may not get access to the key but merely serves as a repository for the encrypted content work. The proxy in such an embodiment is useful in keeping remote access off of the sink's network (when it proxies the sink 640) or the source's network (when it proxies the source 610). Thus, the proxy 635 is beneficial even when it does not have access to the key; that is, it can still protect privacy and limit network access.

In another embodiment, with reference still to FIG. 7, proxy 635 passively acquires a key when the proxy 635 is authorized to do so by the particular licensing authority. In such a "man-in-the-middle" embodiment, the proxy 635 changes the messages between the source 610 and the sink 640 as a method to obtain the plaintext key. In contrast to the conventional use of "man-in-the-middle," here the man-in-the-middle is legitimate (when the proxy 635 is authorized to function as a man-in-the-middle). Thus, according to embodiments of the present invention, a proxy can complete an authenticated key exchange on behalf of some other device (e.g., a proxied device) either as an authorizing proxy or non-authorizing proxy (man-in-the-middle).

Figure 8:
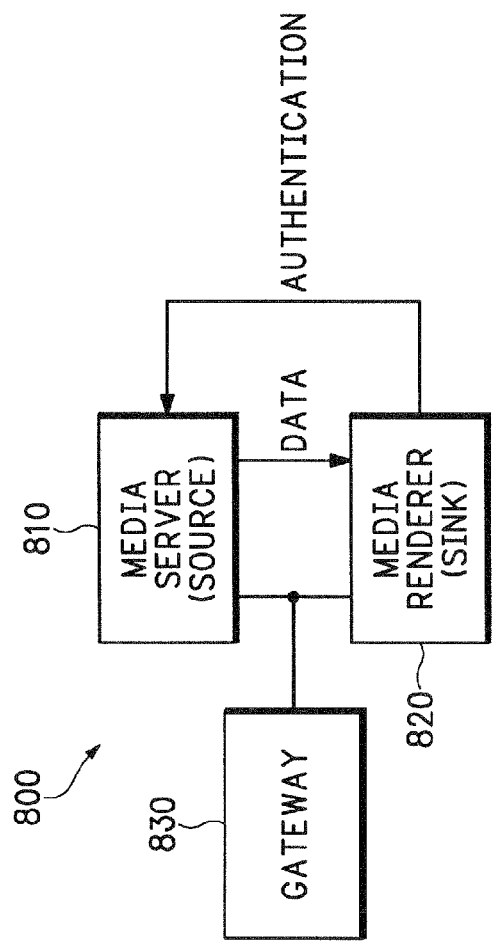
FIG. 8 is a block diagram of a local area network according to one embodiment of the present invention.

FIG. 8 is a block diagram of a local area network (LAN) 800 (e.g., a private, home network) according to one embodiment of the present invention. In the example of FIG. 8, LAN 800 includes a media server (source) 810, a media renderer (sink) 820, and a gateway 830 (which may be a residential gateway). Sink 820 may be, for example, a set-top box or a digital media adapter (DMA).

In one embodiment, the source 810, sink 820 and gateway 830 are enrolled in the home network and are issued credentials, as described previously herein (refer to the discussion in conjunction with FIGS. 1-5 above). Enrollment can be managed by any device in the home network; in one embodiment, enrollment is performed by gateway 830.

In one embodiment, gateway 830 is a residential gateway that, in addition to acting as both an interface and boundary between a WAN and a LAN as described above, also serves as an interface for quality-of-service (QoS) schemes and for the transport of content. In various embodiments, gateway 830 may incorporate a router and a broadband modem, and can support the use of more than one type of home network media (e.g., IEEE 802.11, 10/100 Ethernet, etc.). In one embodiment, gateway 830 is remotely managed by a service provider; that is, the functionality of the gateway 830 is visible to the service provider, and the service provider can install a configuration file or otherwise alter parameters of the gateway 830. Although gateway 830 has just been described as having certain characteristics and features, the present invention is not limited to a device having such characteristics and features.

In general, gateway 830 couples LAN 800 with a wide area network (e.g., the Internet). Gateway 830 provides broadband connectivity to a wide area network (WAN) on one side, and provides access to broadband connectivity for devices on the LAN side. The presence of network address translation (NAT) in gateway 830 provides a boundary between public IP addresses (on the WAN side) and private IP address spaces (on the LAN side).

In the example of FIG. 8, sink 820 authenticates itself to source 810 in order to establish that sink 820 is authorized to receive an item of content (data) from source 810. Different mechanisms can be used for authentication and authorization. As mentioned above, in one embodiment, sink 820 is enrolled and issued a credential, which is used to authenticate and authorize sink 820. In one embodiment, the content is transmitted within LAN 800 using DTCP/IP.

Figure 9:
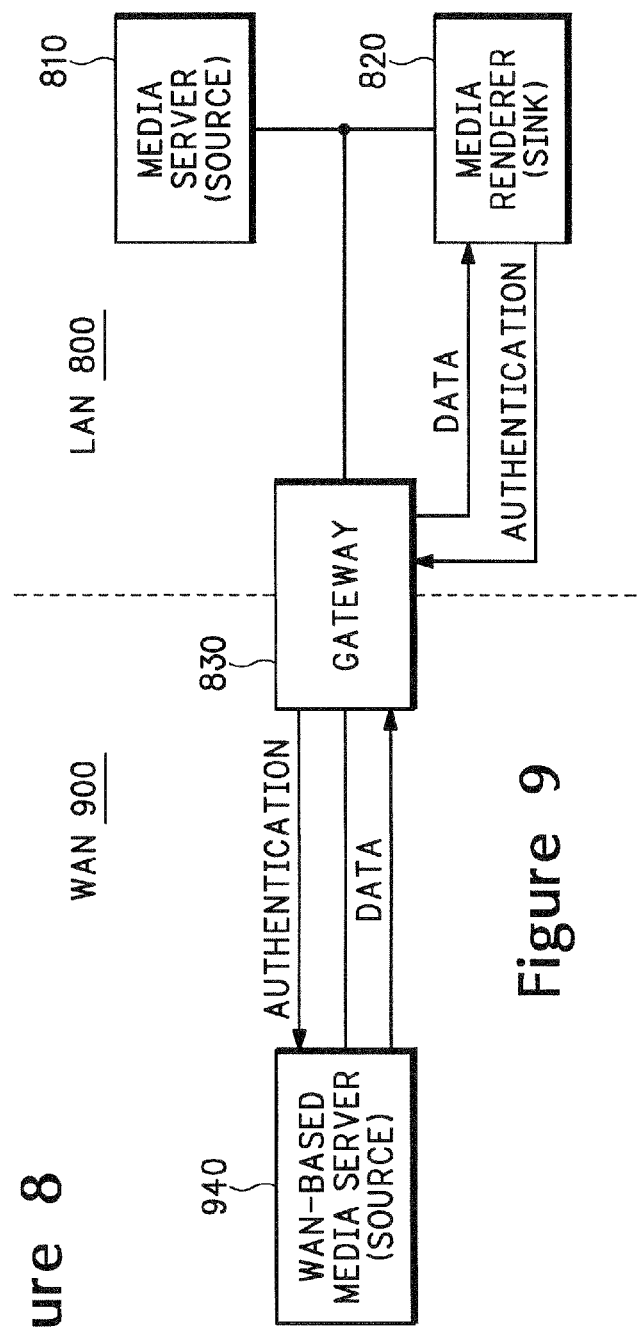
FIGS. 9 and 10 are block diagrams each showing a local area network and wide area network according to embodiments of the present invention.
Figure 10:
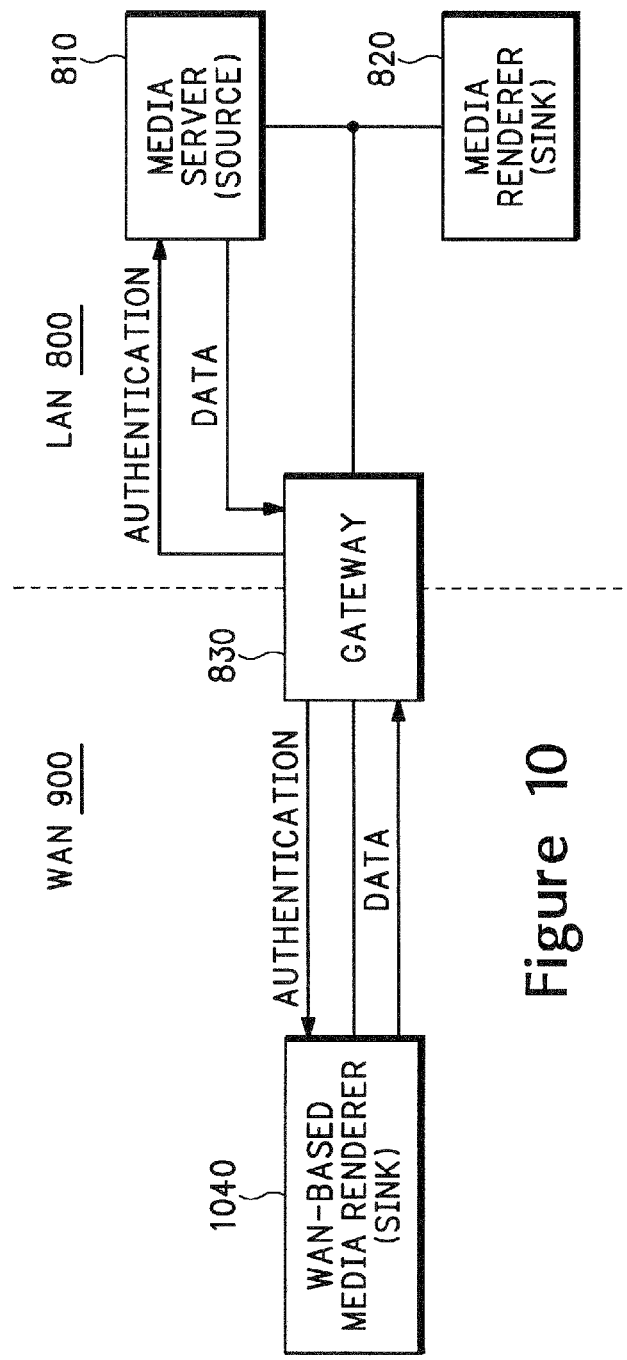

FIGS. 9 and 10 are block diagrams of a LAN 800 (e.g., a home network) and a WAN 900 (e.g., a broadband network such as the Internet) according to embodiments of the present invention. The networks of FIGS. 9 and 10 are analogous to the systems of FIGS. 6 and 7, discussed above.

With reference first to FIG. 9, gateway 830 acts as a proxy sink for content that is sourced from WAN-based media server (source) 940, which is outside of LAN 800. Also, gateway 830 acts as a proxy source for sink 820 located within the LAN 800. The content from WAN-based source 940 is transported in accordance with a DRM scheme (e.g., OMA DRM 2.0). Accordingly, gateway 830 performs DRM "transcryption" to convert from the WAN-based DRM scheme to the DRM scheme used by LAN 800 (e.g., DTCP/IP). Sink 820 then decrypts the content from DTCP/IP and renders (visually or audibly) the content. Note that gateway 830 does not have to render the content.

In the example of FIG. 9, sink 820 authenticates itself to gateway 830, and gateway 830 authenticates itself to WAN-based source 940. Different mechanisms can be used for authentication and authorization. In one embodiment, the sink 820 and gateway 830 are credentialed, as previously described herein. WAN-based source 940 may also be enrolled with LAN 800 and appropriately credentialed. For example, source 940 may be a mobile device that is a member of a home network, but has been temporarily transported outside of the home.

In another embodiment, gateway 830 is an intermediate key establishment system for a secure multicast or broadcast application. Gateway 830 obtains the key from the source 940, which in this case is a source of the keys and not necessarily a source of broadcast or multicast content. In this embodiment, gateway 830 is recognized by source 940 as being authorized to access the key to the secure multicast or broadcast session and is also authorized to distribute the key to a group of media renderers, which are part of the same multicast group. In this way, the source 940 is offloaded of the burden of performing authenticated key establishment with receiver/renderers, which can number in the millions or even tens of millions in large multicast or broadcast groups. When gateway 830 is authorized to perform these functions for source 940, gateway 830 has a credential to prove that authorization and thereby can obtain the key for redistribution from source 940. In one embodiment, gateway 830 obtains this key by substituting its own credential for one of the members of the group (e.g., for sink 820) that requests the key from source 940. Alternatively, gateway 830 can replace all or parts of a key management message from the sink with a message that the intermediate device is authorized to run on behalf of the requesting sink. In either of these ways, gateway 830 "learns" the key and can complete subsequent requests for keys from multicast sink devices.

With reference now to FIG. 10, gateway 830 acts as a proxy sink for content that is sourced from within the LAN 800 (e.g., from source 810). Gateway 830 also acts as a proxy source for a media renderer (sink) 1040, which is outside of LAN 800.

In the example of FIG. 10, gateway 830 authenticates itself to source 810, and sink 1040 authenticates itself to gateway 830. In one embodiment, the source 810 and gateway 830 are credentialed, as previously described herein. Sink 1040 may also be enrolled with LAN 800 and appropriately credentialed. For example, source 1040 may be a mobile device that is a member of a home network, but has been temporarily transported outside of the home.

However, content within LAN 800 is transported according to DTCP/IP, which will not function on WAN 900. Accordingly, gateway 830 performs DRM transcryption to convert from DTCP/IP to a DRM scheme that is used by sink 1040 and which can be used to transport the content over WAN 900. Thus, according to embodiments of the present invention, an item of content that is copy-protected according to DTCP/IP only travels as far as gateway 830. Gateway 830 then transcrypts the content into a DRM scheme that is suitable for transporting the item of content across WAN 900 to sink 1040.

Generally speaking, an item of content on LAN 800 is "wrapped" using the DTCP/IP scheme. Gateway 830 "unwraps" the item of content, then "rewraps" it in a DRM scheme that can be used outside of LAN 800 (a scheme other than DTCP/IP). More specifically, a "wrapped" item of content can consist of a DRM message that includes the content and a rights object associated with the content. The rights object defines usage rules that govern use of the content. The rights object is written into the content according to the DRM scheme being used. The content is usually encrypted, and is decrypted using a key while the rules provided by the rights object are retained. Gateway 830 converts (transcrypts) the content protection provided according to DTCP/IP into a content protection scheme or format that can be used outside of LAN 800.

In one embodiment, gateway 830 has knowledge of a number of DRM schemes in addition to DTCP/IP. As new DRM schemes are introduced, gateway 830 can be updated. Gateway 830 also incorporates the capability to recognize the particular DRM scheme used by sink 1040. Alternatively, sink 1040 can identify to gateway 830 the type of DRM scheme that sink 1040 is using. This can be accomplished at the time that sink 1040 is enrolled with LAN 800, at the time the item of content is requested by sink 1040, or virtually anytime in between.

Although gateway 830 is described as an element separate from the other devices (e.g., sinks and sources) in LAN 800, the functionalities provided by gateway 830 can alternatively be implemented on any of the devices in LAN 800. That is, for example, a source or sink device on LAN 800 can provide dual functionality, operating as a source or sink and also operating as a gateway device.

Also, in one embodiment, gateway 830 is an intermediate key establishment system as described above in conjunction with FIG. 9, but where in that discussion source 810 of FIG. 10 is substituted for source 940 of FIG. 9, and sink 1040 is substituted for sink 820.

Figure 11:
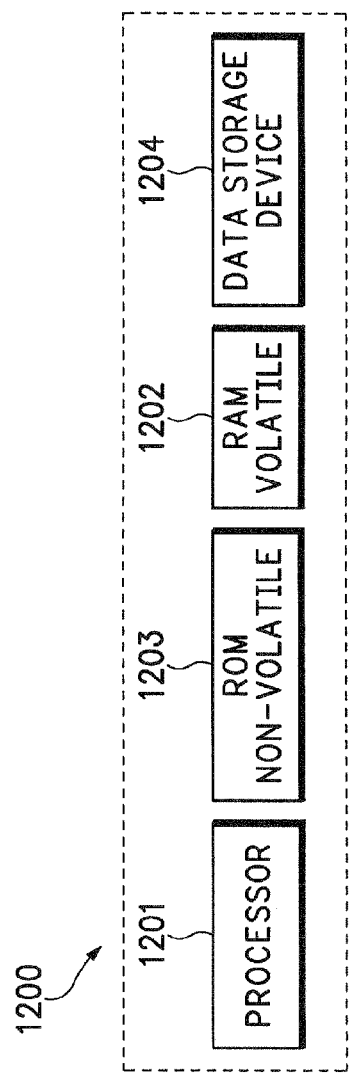
FIG. 11 is a flowchart of a method for managing the distribution of content according to one embodiment of the present invention.

FIG. 11 is a flowchart 1100 of a method for managing the distribution of content according to one embodiment of the present invention. Although specific steps are disclosed in flowchart 1100, such steps are exemplary. That is, embodiments of the present invention are well suited to performing various other (additional) steps or variations of the steps recited in flowchart 1100. It is appreciated that the steps in flowchart 1100 may be performed in an order different than presented, and that not all of the steps in flowchart 1100 may be performed. In one embodiment, flowchart 1100 is implemented on a gateway (e.g., gateway 830 of FIGS. 9 and 10).

In step 1110 of FIG. 11, in one embodiment, a request for an item of content is received from a sink device. The request is sent over a WAN (e.g., the Internet). The item of content resides on a LAN. Distribution of the item of content within the LAN uses a first DRM protocol that prevents the item of content from being distributed outside the LAN (e.g., DTCP/IP).

In step 1120, for the requested item of content, the gateway converts the first DRM protocol to a second DRM protocol that can be used for transmitting content over the WAN. The item of content can then be forwarded to the sink device according to the second DRM protocol. In one embodiment, the sink device authenticates itself using a credential that binds the sink device to the LAN, thus demonstrating that it is authorized to receive the content.

Figure 12:
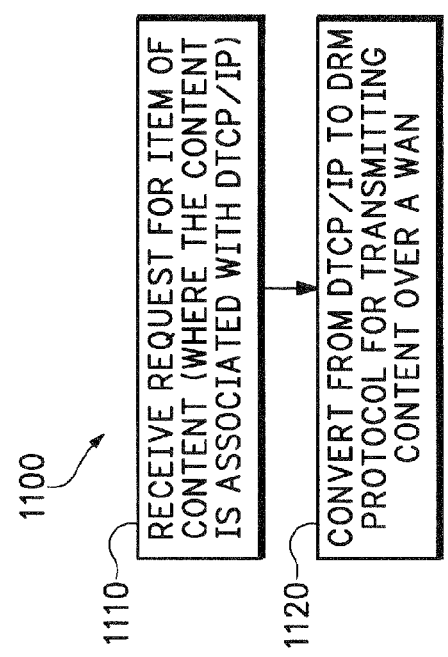
FIG. 12 is a block diagram of a device upon which embodiments of the present invention may be implemented.

FIG. 12 is a block diagram of a device 1200 (e.g., a gateway or residential gateway) upon which embodiments of the present invention may be implemented. In general, device 1200 includes processor 1201 for processing information and instructions, random access (volatile) memory 1202 for storing information and instructions for processor 1201, read-only (non-volatile) memory 1203 for storing static information and instructions for processor 1201, and data storage device 1204 such as a magnetic or optical disk and disk drive for storing content. Device 1200 may include an optional user output device and an optional user input device for communicating information and command selections.

In summary, a device (e.g., gateway 830) can act as a proxy sink for content that is sourced from outside a LAN. Also, the device can act as a proxy source for a sink (e.g., a DMA) that is located within the LAN. The sink (inside the LAN) authenticates itself to the proxy source (the device, e.g., the gateway 830), and the proxy sink (again, the device, e.g., gateway 830) authenticates itself to the source (outside the LAN). This means that the device (e.g., gateway 830) performs a DRM transcryption from the DRM scheme that is used to traverse the broadband WAN (e.g., the Internet) to DTCP/IP for the LAN (refer to FIG. 9).

Also, the device (e.g., gateway 830) can act as a proxy sink for content that is sourced from within the LAN. Also, the device can act as a proxy source for a sink (e.g., a DMA) that is located outside the LAN. The sink (outside the LAN) authenticates itself to the proxy source (the device, e.g., the gateway 830), and the proxy sink (again, the device, e.g., gateway 830) authenticates itself to the source (inside the LAN). This means that the device (e.g., gateway 830) performs a DRM transcryption from DTCP/IP to the DRM scheme that is used to traverse the broadband WAN (refer to FIG. 10). Thus, embodiments of the present invention can help resolve consumer and industry concerns with the issue referred to as "affinity" (that is, the ability for individuals to access home-based content they own from outside their home).

According to embodiments of the present invention, a mobile (roaming or nomadic) device does not need to support multiple DRM schemes; when the mobile device is in the home network, it can support DTCP/IP, and when it is outside the home network, it can support a single appropriate DRM scheme, which is transcypted into DTCP/IP by, for example, the gateway device of the home network. Furthermore, devices on the home network do not need to support multiple DRM schemes. Instead, the devices on the home network can support only DTCP/IP, which is transcypted by, for example, the gateway device of the home network into a DRM scheme appropriate for transporting content over a WAN to a mobile device.

Thus, content from inside a home network can be transported to an authorized device outside the home network, and devices inside a home network can render content sourced from outside the home network. Rather than building the capability to support many different DRM schemes into home network devices, this capability is instead provided by a device such as a residential gateway.

Note that the mobile device does not necessarily have to support DTCP/IP when operating on the home network; whether the mobile device is roaming or not, it can use a device such as gateway 830 (FIGS. 9 and 10) to transcrypt DTCP/IP content into the DRM scheme supported by the mobile device, and vice versa. In fact, a device such as gateway 830 can provide this service to any device on the home network.

Embodiments of the present invention are thus described. While the present invention has been described in particular embodiments, it should be appreciated that the present invention should not be construed as limited by such embodiments, but rather construed according to the below claims.

What is claimed is:

1. A method for controlling access to a service over a network, said method comprising:
   receiving a network-service credential at a sink device, wherein said network-service credential is issued by a provider of said service and includes a value to indicate that said sink device is enrolled in said network, wherein the value is selected from the group including a name of the service provider and an Internet Protocol (IP) address of the service provider;
   identifying a device-manufacturer credential that is stored in a non-volatile memory of said sink device and that identifies a manufacturer of said device;
   storing said network-service credential in said non-volatile memory on said sink device to replace the device-manufacturer credential, wherein the existence of said network-service credential in said non-volatile memory binds said sink device to said network and prevents said sink device from accessing other networks besides the network;
   said sink device presenting said network-service credential to the provider of said service, wherein said provider uses said network-service credential to authenticate and authorize said sink device, wherein upon authorization said device is provided access to said service;
   receiving from the sink device over a Wide Area Network (WAN) a request for an item of content available on a source device that is located in a Local Area Network (LAN), and forward the request for the item of content to the source device;
   exchanging messages to authenticate the sink device, the exchanged messages for verifying the presence of said network-service credential in a non-volatile memory of the sink device;
   after the sink device is authenticated, receiving a communication sent from the source device over the LAN, the communication sent according to a first digital rights management protocol and including both the item of content and rights objects that define rules governing usage of the item of content;
   transcrypting the communication into a second digital rights management protocol such that the rights objects are retained; and
   transmitting the communication that is wrapped in the second digital rights management protocol and that contains both the item of content and the rights objects over the WAN to the authenticated sink.

2. The method of claim 1, further comprising distributing a received decryption key to the sink device after the sink device is authenticated.

3. A system, comprising:
   a device circuitry configured to receive a network service credential at a device, wherein said network service credential indicates that said device is enrolled in a network, and wherein said network service credential contains at least one value selected from the group including a service provider name and service provider address;
   the device circuitry configured to identify a location on a non-volatile memory of said device, the identified location storing a device-manufacturer credential that identifies a manufacturer of said device;
   the device circuitry configured to store said credential in the identified location to replace the device-manufacturer credential, wherein the presence of said network service credential enrolls said device in said network and prevents, according to an authorization scheme, said device from accessing other networks besides the network;
   the device circuitry configured to present said network service credential before accessing content associated with the enrolled network;
   a gateway having a first gateway interface for coupling to a first network and a second gateway interface for coupling to a second different network, the gateway interfaces for providing the first network access to the second network; and
   the gateway having a circuitry configured to:
      receive over the second interface a request for a content item available on a source device that is located in the first network, and forward the request for the content item to the source device;
      receive over the first interface a communication sent from the source device, the communication sent according to a first digital rights management protocol and including both the content item and rights objects that define rules governing usage of the content item;
      transcrypt the communication into a second digital rights management protocol such that the rights objects are retained; and
      transmit the communication that is wrapped in the second digital rights management protocol and that contains both the content item and the rights objects over the second interface
      relay an authorization message between the networks using the gateway interfaces, the authorization message associated with the request for the content item; while relaying the authorization message, inspect the authorization message to learn a decryption key included in the authorization message; and retain the learned decryption key for later use,
      receive a different authorization message associated with a different request for the same or another content item, the different request originating from a different sink device and received over the second gateway interface; and perform authorization for the different sink device and handle distribution of the learned decryption key to the different sink device.

4. The system of claim 3, wherein the network service credential contains both the name and address of the service provider.

5. An apparatus, comprising:
a sink device;
a source device;
a bus;
one or more processors coupled to said bus; and
a memory unit coupled to said bus, said memory unit containing instructions that when executed by the processors are operable to:
receive a network service credential sent from an issuing device operated by a service provider that controls access to a service, the network service credential logically associating the network service credential with the service provider through inclusion of a name or address of the service provider in the network service credential;
identify, in a non-volatile memory of said apparatus, a location corresponding to device-manufacturer credential that identifies a manufacturer of said apparatus;
store said network service credential in the identified location in the non-volatile memory, wherein the presence of said network service credential in the identified location binds said apparatus to said network, wherein the presence of the network service credential in the identified location controls whether the apparatus is authorized to transfer content between the network and another network; and
present said network service credential to said service provider for allowing said service provider to authenticate and authorize said apparatus to access the service based on the network service credential;
receive a request from the sink device for a content item;
identify a subnet to which the sink device belongs, and identify a network service credential stored on the sink device;
compare the identified subnet to a subnet to which the apparatus belongs, and compare the identified network service credential to the stored network service credential;
determine that the sink device is a household device if the subnets match and the network service credentials match;
determine that the sink device is a mobile device if the subnets are different but the network service credentials match;
determine that the sink device is a visitor device if the subnets match but the network service credentials do not match;
determine that the sink device is a foreign device if the subnets are different and the network service credentials are different;
provide the sink device access to the content item according to whether the sink device is a household device, a mobile device, or a visitor device; and
wherein the source device outputs content associated with the service after authentication and authorization is successful, the source device outputting the content encrypted with a first digital rights management protocol, and wherein the gateway transcrypts the content to encrypt with a second different digital rights management protocol.

6. The apparatus of claim 5, wherein said network service credential logically associates the apparatus with the service provider by including an Internet Protocol (IP) address that corresponds to a network associated with the network service credential.

7. The apparatus of claim 5, wherein said network service credential logically associates the network service credential with the service provider by including a sixteen Byte name of the service provider.

8. The apparatus of claim 5, wherein said network service credential logically associates a home network that includes the apparatus with the service provider by including a subscriber identifier that is defined by the service provider and that includes a medium access control address of a broadband modem that provides the apparatus access from the home network to the Internet.

9. The apparatus of claim 5, wherein the apparatus operates in a home network comprising a plurality of network devices coupled to a local gateway, said local gateway couplable via the Internet to a remote server for said provider, wherein said apparatus enrolls with said local gateway which enrolls with said remote server.

10. The apparatus of claim 5, wherein said apparatus is also associated with an Internet Protocol (IP) address, wherein said apparatus IP address is used in combination with said network service credential to determine whether access to said service is permitted.

11. The apparatus of claim 5, wherein the network service credential is stored in a portion of said non-volatile memory that is initially used for storing a manufacturer-device certificate.

12. A gateway, comprising:
a sink device;
a source device;
a bus;
one or more processors; and
a memory unit coupled to said bus, said memory unit containing instructions that when executed by the processors are operable to:
receive a network service credential sent from an issuing device operated by a service provider that controls access to a service, the network service credential logically associating the network service credential with the service provider through inclusion of a name or address of the service provider in the network service credential;
identify a location in a non-volatile memory of a device for storing a device-manufacturer credential that identifies a manufacturer of said device;
store the received credential in the identified location in the memory to replace the device-manufacturer credential, the presence of the credential in the identified location controlling whether the gateway is authorized to transfer data between the device and a remote network;
receive a request from the sink device for a content item;
identify a subnet to which the sink device belongs, and identify a network service credential stored on the sink device;
compare the identified subnet to a subnet to which the gateway belongs, and compare the identified network service credential to the stored network service credential;
determine that the sink device is a household device if the subnets match and the network service credentials match;

determine that the sink device is a mobile device if the subnets are different but the network service credentials match;

determine that the sink device is a visitor device if the subnets match but the network service credentials do not match;

determine that the sink device is a foreign device if the subnets are different and the network service credentials are different;

provide the sink device access to the content item according to whether the sink device is a household device, a mobile device, or a visitor device; and wherein the source device outputs content associated with the service after authentication and authorization is successful, the source device outputting the content encrypted with a first digital rights management protocol, and wherein the gateway transcrypts the content to encrypt with a second different digital rights management protocol.

13. The gateway of claim 12, wherein the processors are further operable to determine whether the content item is to be provided to mobile devices, and if the content item is to be provided to mobile devices, authorizing the sink to access the content item if the sink is determined to be a household device or a mobile device.

14. The gateway of claim 12, wherein the processors are further operable to determine whether the content item is to be provided to visitor devices, and if the content item is to be provided to visitor devices, authorizing the sink to access the content item if the sink is determined to be a household device, a mobile device, or a visitor device.

* * * * *

UNITED STATES PATENT AND TRADEMARK OFFICE
CERTIFICATE OF CORRECTION

PATENT NO. : 7,500,269 B2  Page 1 of 1
APPLICATION NO. : 11/075197
DATED : March 3, 2009
INVENTOR(S) : Huotari et al.

It is certified that error appears in the above-identified patent and that said Letters Patent is hereby corrected as shown below:

At column 14, line 58, please replace "the second interface" with --the second interface;--.
At column 14, line 65, please replace "for later use," with --for later use;--.
At column 15, line 26, please replace "corresponding to device-manufacturer" with --corresponding to a device-manufacturer--.
At column 15, line 35, please replace "work; and" with --work;--.

Signed and Sealed this

Twenty-eighth Day of April, 2009

JOHN DOLL
*Acting Director of the United States Patent and Trademark Office*